US012804515B2

(12) United States Patent
Yu et al.

(10) Patent No.: US 12,804,515 B2
(45) Date of Patent: Nov. 17, 2026

(54) # REPORTING RADIO LINK FAILURE IN MULTIPATH OR MULTI-CONNECTIVITY SCENARIO

(71) Applicant: Nokia Technologies Oy, Espoo (FI)

(72) Inventors: Ling Yu, Kauniainen (FI); SunYoung Lee, Seoul (KR); Faranaz Sabouri-Sichani, Aalborg (DK); Vinh Van Phan, Oulu (FI); György Tamás Wolfner, Budapest (HU); Jakob Lindbjerg Buthler, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 412 days.

(21) Appl. No.: 18/621,252

(22) Filed: Mar. 29, 2024

(65) Prior Publication Data

US 2024/0340769 A1 Oct. 10, 2024

(30) Foreign Application Priority Data

Apr. 4, 2023 (GB) ...................................... 2304965

(51) Int. Cl.

*H04W 40/34* (2009.01)
*H04L 43/0811* (2022.01)
*H04W 8/00* (2009.01)
*H04W 76/19* (2018.01)

(52) U.S. Cl.

CPC ......... *H04W 40/34* (2013.01); *H04L 43/0811* (2013.01); *H04W 8/005* (2013.01); *H04W 76/19* (2018.02)

(58) Field of Classification Search

None
See application file for complete search history.

(56) References Cited

U.S. PATENT DOCUMENTS

2015/0131540 A1 5/2015 Koo et al.
2018/0343598 A1* 11/2018 Xu ...................... H04W 36/033
2019/0089579 A1* 3/2019 Sang ...................... H04B 7/088
2019/0229980 A1 7/2019 Han et al.
2019/0274179 A1* 9/2019 Vajapeyam ........... H04W 24/04
2021/0068187 A1 3/2021 Baghel et al.
(Continued)

FOREIGN PATENT DOCUMENTS

EP 3641192 A1 4/2020
EP 4142177 A1 3/2023

OTHER PUBLICATIONS

"Revised WID on NR sidelink relay enhancements", 3GPP TSG RAN Meeting #98e, RP-223501, Agenda: 9.3.2.4, LG Electronics, Dec. 12-16, 2022, 6 pages.
(Continued)

*Primary Examiner* — Srinivasa R Reddivalam
(74) *Attorney, Agent, or Firm* — Barta Jones, PLLC

(57) ABSTRACT

There is provided an apparatus, comprising: at least one processor; and at least one memory storing instructions that, when executed by the at least one processor, cause the apparatus at least to perform: detecting radio link failure of a path among a plurality of paths, wherein the apparatus is configured to be connected to at least one network node via the plurality of paths; and determining, after detecting the radio link failure and based on at least one measurement result, whether to report the detected radio link failure of the path via another path among the plurality of paths.

20 Claims, 8 Drawing Sheets

(56) References Cited

U.S. PATENT DOCUMENTS

| | | | | |
|---|---|---|---|---|
| 2021/0168690 | A1 | 6/2021 | Zheng et al. | |
| 2022/0150730 | A1 | 5/2022 | Freda et al. | |
| 2022/0400417 | A1 | 12/2022 | Zhang | |
| 2023/0074899 | A1 | 3/2023 | Wang et al. | |
| 2023/0262564 | A1 * | 8/2023 | Cheng | H04W 36/033 370/225 |
| 2025/0150931 | A1 * | 5/2025 | Orsino | H04W 40/00 |

OTHER PUBLICATIONS

"Universal Mobile Telecommunications System (UMTS); LTE; 5G; NR; Multi-connectivity; Overall description; Stage-2 (3GPP TS 37.340 version 17.3.0 Release 17)", ETSI TS 137 340, V17.3.0, Jan. 2023, 120 pages.

"Basic control plane aspects for Multi-path Scenario 1&2", 3GPP TSG-RAN WG2 Meeting #121, R2-2300689, Agenda: 8.9.4, vivo, Feb. 27-Mar. 3, 2023, 6 pages.

"3rd Generation Partnership Project; Technical Specification Group Radio Access Network; NR; User Equipment (UE) procedures in Idle mode and RRC Inactive state (Release 17)", 3GPP TS 38.304, V17.3.0, Dec. 2022, pp. 1-51.

"Considerations for U2U L2 relay operations", 3GPP TSG-RAN WG2 #121, R2-2301414, Agenda: 8.9.2, Kyocera, Feb. 27-Mar. 3, 2023, 6 pages.

Search Report received for corresponding United Kingdom Patent Application No. 2304965.3, dated Oct. 18, 2023, 5 pages.

Extended European Search Report received for corresponding European Patent Application No. 24167087.6, dated Jul. 10, 2024, 6 pages.

"Discussion on Multi-path for Scenario 1", 3GPP TSG-RAN WG2 Meeting #120, R2-2211281, Agenda: 8.9.4, CATT, Nov. 14-18, 2022, 7 pages.

"Discussion on RLF handling for multi-path relaying", 3GPP TSG-RAN WG2 Meeting #119bis electronic, R2-2209732, Agenda: 8.9.4, China Telecom, Oct. 10-19, 2022, 3 pages.

* cited by examiner

REPORTING RADIO LINK FAILURE IN MULTIPATH OR MULTI-CONNECTIVITY SCENARIO

FIELD

Various example embodiments relate to reporting radio link failure (RLF) in multipath or multi-connectivity scenario.

BACKGROUND

A user equipment (UE) may be connected to a network node, or to a plurality of network nodes, via a plurality of paths. In multipath connectivity scenario, the UE may be connected to at least one network node via direct path(s) and via indirect path(s). In multi-connectivity scenario, the UE may be connected to at least one network node via direct paths. A radio link failure may occur in one of the paths.

SUMMARY

According to some aspects, there is provided the subject-matter of the independent claims. Some example embodiments are defined in the dependent claims. The scope of protection sought for various example embodiments is set out by the independent claims. The example embodiments and features, if any, described in this specification that do not fall under the scope of the independent claims are to be interpreted as examples useful for understanding various example embodiments.

According to an aspect, there is provided a method, comprising: detecting, by a user equipment, radio link failure of a path among a plurality of paths, wherein the user equipment is configured to be connected to at least one network node via the plurality of paths; and determining, after detecting the radio link failure and based on at least one measurement result, whether to report the detected radio link failure of the path via another path among the plurality of paths. The method may be performed by a user equipment.

According to an embodiment, at least one path of the plurality of paths is an indirect path via a relay user equipment.

According to an embodiment, the method comprises: performing at least one radio measurement to obtain the at least one measurement result.

According to an embodiment, the method comprises: performing at least one of the following measurements: data rate of the another path; average delay of the another path; amount of data in a buffer of the apparatus; channel busy ratio of the another path; average bit rate of the another path; measurement of at least one other cell than a serving cell of the apparatus; or measurement of at least one candidate relay user equipment.

According to an embodiment, the method comprises: receiving a configuration for the at least one measurement.

According to an embodiment, the configuration is indicative of at least one threshold related to the at least one measurement, wherein the at least one threshold sets a condition for reporting the detected radio link failure.

According to an embodiment, the determining, based on at least one measurement result, whether to report the detected radio link failure of the path via another path among the plurality of paths comprises: comparing the at least one measurement result to at least one threshold, wherein the at least one threshold sets a condition for reporting the detected radio link failure; determining, based on the comparison, that the at least one measurement result meets the condition set by the at least one threshold; and the method comprises: based on determining that the at least one measurement result meets the condition set by the at least one threshold, reporting the detected radio link failure of the path via another path among the plurality of paths.

According to an embodiment, the at least one measurement result is obtained from a measurement of at least one other cell than a serving cell of the apparatus; and the detected radio link failure is detected on a direct path.

According to an embodiment, the method comprises: reporting the at least one measurement result obtained from the measurement of the at least one other cell; and receiving a reconfiguration to directly connect to the at last one other cell.

According to an embodiment, the at least one measurement result is obtained from a measurement relating to discovery of at least one candidate relay user equipment; and the detected radio link failure is detected on the indirect path; and the method comprises: determining that the at least one measurement result indicates that at least one candidate relay user equipment has been found in discovery; based on the determining that the at least one measurement result indicates that at least one candidate relay user equipment has been found in discovery, reporting the detected radio link failure of the indirect path via the another path.

According to an embodiment, the method comprises: reporting the at least one measurement result obtained from the measurement relating to discovery of at least one candidate relay user equipment; and receiving a reconfiguration to switch the indirect path to the at least one candidate relay user equipment found in discovery.

According to an embodiment, the at least one measurement result indicates that the detected radio link failure has occurred in a radio link between the user equipment and the relay user equipment; the method comprises: based on the at least one measurement result indicating that the detected radio link failure is in the radio link between the user equipment and the relay user equipment, reporting the detected radio link failure via the another path.

According to an embodiment, the determining, based on at least one measurement result, whether to report the detected radio link failure of the path via another path among the plurality of paths comprises: comparing the at least one measurement result to at least one threshold; determining, based on the comparison, that the at least one measurement result does not meet a condition set by the at least one threshold; and the method comprises: based on determining that the at least one measurement result does not meet a condition set by the at least one threshold, refraining from reporting the detected radio link failure.

According to an embodiment, the method comprises: receiving a configuration for reporting measurement data via the another path, wherein the configuration is indicative of at least one condition for reporting, and wherein the measurement data comprises at least one of: measurement data related to the another path; measurement data related to at least one other cell; or measurement data related to at least one candidate relay user equipment.

According to an embodiment, the configuration comprises an instruction for the user equipment to report, after detecting the radio link failure of the path, the measurement data according to the configuration.

According to an embodiment, the method comprises: reporting, via the another path, the measurement data according to the configuration; detecting a radio link failure on the another path; determining a prioritized cell or a prioritized candidate relay user equipment based on the reported measurement data; and transmitting a re-establishment request via the prioritized cell or the prioritized candidate relay user equipment.

According to an embodiment, the method comprises: determining, based on at least one measurement result obtained from a measurement of data transmission via the another path, that the another path meets traffic requirements of the user equipment; and based on the determining that the another path meets traffic requirements of the user equipment, refraining from reporting the detected radio link failure.

According to an embodiment, the method comprises: determining, based on at least one measurement result obtained from a measurement of data transmission via the another path, whether to report measurement data related to at least one other cell than a serving cell of the apparatus and/or measurement data related to at least one candidate relay user equipment and/or measurement data related to the another path.

According to an embodiment, the at least one measurement result indicates that the another path meets traffic requirements of the user equipment, and the method comprises: based on the at least one measurement result indicating that the another path meets traffic requirements of the user equipment, refraining from reporting measurement data related to the at least one other cell than the serving cell of the apparatus and/or measurements data related to at least one candidate relay user equipment and/or measurement data related to the another path.

According to an aspect, there is provided an apparatus comprising means for performing the method of the aspect above and any of the embodiments thereof. The apparatus may be a user equipment.

According to an embodiment, the means comprises at least one processor; and at least one memory storing instructions that, when executed by the at least one processor, cause the performance of the apparatus. The apparatus may be a user equipment.

According to an aspect, there is provided a (non-transitory) computer readable medium comprising instructions that when executed by an apparatus, cause the apparatus to perform the method of the aspect above and any of the embodiments thereof. The apparatus may be a user equipment.

According to an aspect, there is provided a computer program comprising instructions, which, when executed by an apparatus, cause the apparatus to perform the method of the aspect above and any of the embodiments thereof. The apparatus may be a user equipment.

According to an aspect, the method comprises: transmitting, by a network node to a user equipment configured to be connected to a network of the network node via a plurality of paths, a configuration for at least one measurement, wherein the configuration is indicative of at least one threshold related to the at least one measurement, wherein the at least one threshold sets a condition for reporting a radio link failure detected in a path among the plurality of paths. The method may be performed by a network node.

According to an embodiment, the method comprises: receiving a report of the radio link failure without measurement data, wherein the report is indicative of a failed path; determining, based on the report without measurement data, that the user equipment does not need path recovery procedures; and/or stopping transmissions via the failed path.

According to an embodiment, the method comprises: transmitting, to the user equipment, a configuration for reporting measurement data via the another path, wherein the configuration is indicative of at least one condition for reporting, and wherein the measurement data comprises at least one of: measurement data related to the another path; measurement data related to at least one other cell; or measurement data related to at least one candidate relay user equipment.

According to an embodiment, the configuration comprises an instruction for the user equipment to report, after detecting the radio link failure of the path, the measurement data according to the configuration.

According to an embodiment, the method comprises receiving, via the another path, the measurement data according to the configuration.

According to an embodiment, the method comprises determining, based on the received measurement data, a prioritized cell or a prioritized candidate relay user equipment for the user equipment; and preparing the prioritized cell to recover the failed path or for handover; or preparing the prioritized candidate relay user equipment for path switching.

According to an embodiment, the method comprises receiving a re-establishment request via the prioritized cell or the prioritized candidate relay user equipment.

According to an aspect, there is provided an apparatus comprising means for performing the method of the aspect above and any of the embodiments thereof. The apparatus may be a network node.

According to an embodiment, the means comprises at least one processor; and at least one memory storing instructions that, when executed by the at least one processor, cause the performance of the apparatus. The apparatus may be a network node.

According to an aspect, there is provided a (non-transitory) computer readable medium comprising instructions that when executed by an apparatus, cause the apparatus to perform the method of the aspect above and any of the embodiments thereof. The apparatus may be a network node.

According to an aspect, there is provided a computer program comprising instructions, which, when executed by an apparatus, cause the apparatus to perform the method of the aspect above and any of the embodiments thereof. The apparatus may be a network node.

BRIEF DESCRIPTION OF THE DRAWINGS

Some example embodiments will now be described with reference to the accompanying drawings.

DETAILED DESCRIPTION

Figure 1:
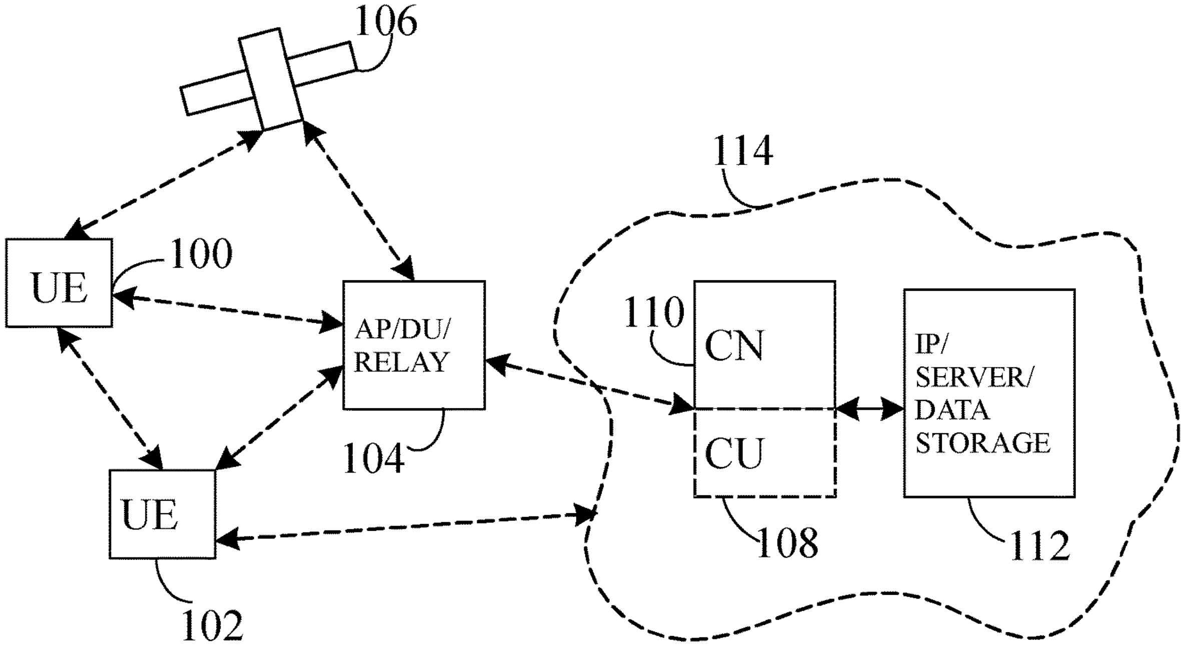
FIG. 1 shows, by way of example, a network architecture of communication system.

FIG. 1 shows, by way of an example, a network architecture of communication system. In the following, different exemplifying embodiments will be described using, as an example of an access architecture to which the embodiments may be applied, a radio access architecture based on long term evolution advanced (LTE Advanced, LTE-A) or new radio (NR), also known as fifth generation (5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

The example of FIG. 1 shows a part of an exemplifying radio access network. FIG. 1 shows user devices or user equipments (UEs) 100 and 102 configured to be in a wireless connection on one or more communication channels in a cell with an access node, such as gNB, i.e. next generation NodeB, or eNB, i.e. evolved NodeB (eNodeB), 104 providing the cell. The physical link from a user device to the network node is called uplink (UL) or reverse link and the physical link from the network node to the user device is called downlink (DL) or forward link. It should be appreciated that network nodes or their functionalities may be implemented by using any node, host, server or access point etc. entity suitable for such a usage. A communications system typically comprises more than one network node in which case the network nodes may also be configured to communicate with one another over links, wired or wireless, designed for the purpose. These links may be used for signalling purposes. The network node is a computing device configured to control the radio resources of the communication system it is coupled to. The network node may also be referred to as a base station (BS), an access point or any other type of interfacing device including a relay station capable of operating in a wireless environment. The network node includes or is coupled to transceivers. From the transceivers of the network node, a connection is provided to an antenna unit that establishes bi-directional radio links to user devices. The antenna unit may comprise a plurality of antennas or antenna elements. The network node is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. An example of the network node configured to operate as a relay station is integrated access and backhaul node (IAB). The distributed unit (DU) part of the IAB node performs BS functionalities of the IAB node, while the backhaul connection is carried out by the mobile termination (MT) part of the IAB node. UE functionalities may be carried out by IAB MT, and BS functionalities may be carried out by IAB DU. Network architecture may comprise a parent node, i.e. IAB donor, which may have wired connection with the CN, and wireless connection with the IAB MT.

The user device, or user equipment UE, typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction.

Additionally, although the apparatuses have been depicted as single entities, different units, processors and/or memory units (not all shown in FIG. 1) may be implemented inside these apparatuses, to enable the functioning thereof.

5G enables using multiple input-multiple output (MIMO) technology at both UE and gNB side, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 7 GHZ, cmWave and mmWave, and also being integratable with existing legacy radio access technologies, such as the LTE. Below 7 GHZ frequency range may be called as FR1, and above 24 GHz (or more exactly 24-52.6 GHZ) as FR2, respectively. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 7 GHZ-cmWave, below 7 GHZ-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 104) and non-real time functions being carried out in a centralized manner (in a centralized unit, CU 108).

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano) satellites are deployed). Each satellite 106 in the constellation may cover several satellite-enabled network entities that create on-ground cells. The on-ground cells may be created through an on-ground relay node 104 or by a gNB located on-ground or in a satellite.

Figure 2:
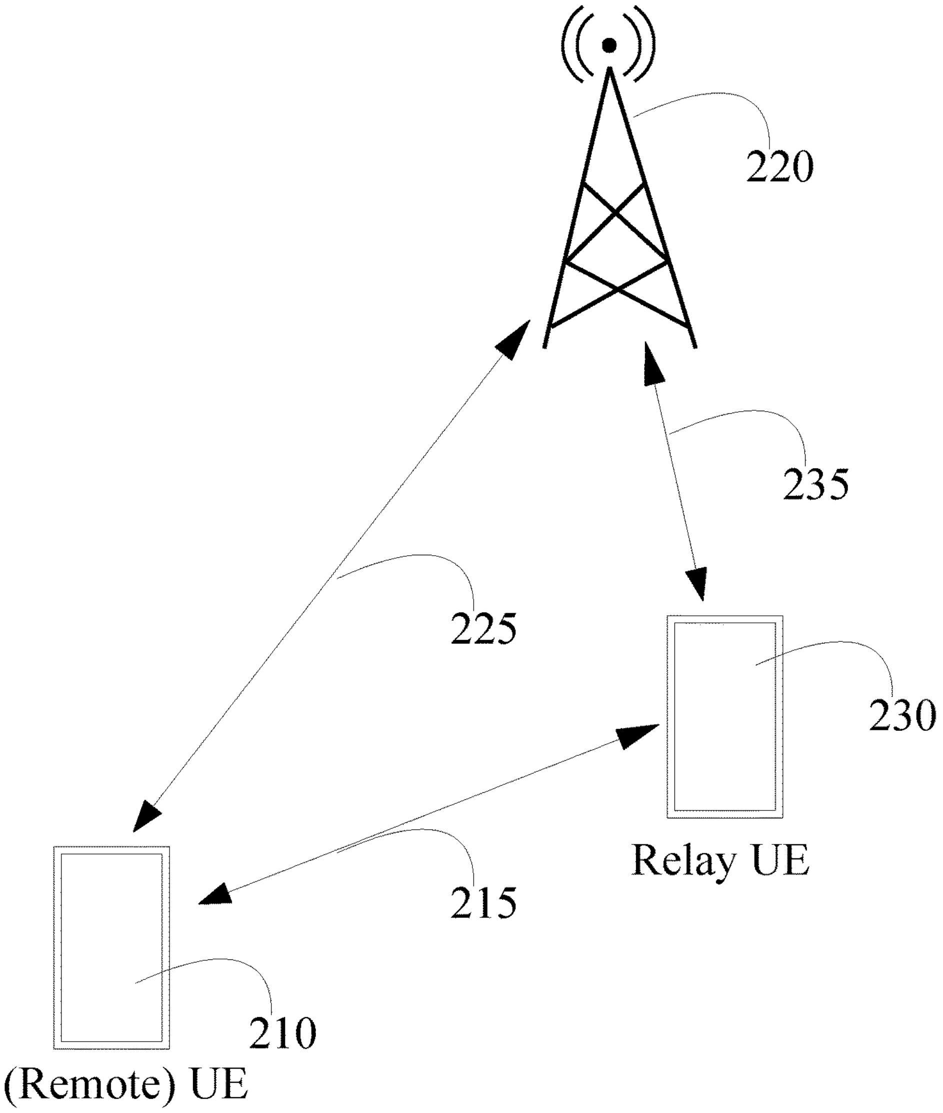
FIG. 2 shows, by way of example, a user equipment configured with multipath connectivity.

FIG. 2 shows, by way of example, a user equipment configured with multipath connectivity. A user equipment (UE), e.g. remote UE 210, is configured with multipath (MP) connectivity. The remote UE 210 is connected to at least one network node 220 via a plurality of paths simultaneously. Such a path may be a direct path 225 or an indirect path 215, 235. For example, at least one path of the plurality of paths may be an indirect path. When the UE 210 is connected to the network node 220 via indirect path, there is a relay UE 230 in between the UE 210 and the network node 220.

The remote UE 210 may be connected to the relay UE 230 via sidelink connection, e.g. via PC5 interface. The relay UE 230 may be connected to the network node 220 via air interface, e.g. Uu interface.

The remote UE 210 may be directly connected to the network node 220 via air interface, e.g. Uu interface.

In the example of FIG. 2, the remote UE 210 has established MP connectivity via a direct path 225 and an indirect path 215, 235 to the network node 220, that is, to only one network node. The remote UE 210 may establish MP connectivity to a plurality of network nodes. For example, the remote UE 210 may be connected to a first network node via direct connection and to a second network node via indirect connection. As another example, the remote UE 210 may be connected to a first network node via indirect connection and to a second network node via indirect connection. As a further example, the remote UE 210 may be connected to the network node 220 via two separate indirect connections via separate relay UEs.

Remote UE may detect a radio link failure (RLF) of a path among the plurality of paths. The RLF may be detected in direct path or in indirect path. The UE may detect the RLF in various manners. For example, the UE may detect, based on data transmission status, that RLF has occurred in a path. The data transmission status may be, for example, the automatic repeat request (ARQ) or hybrid automatic repeat request (HARQ) feedbacks and the number of ARQ or HARQ retransmissions. The UE may detect, for example, that ARQ or HARQ negative acknowledgement (NACK) is received after maximum number of ARQ or HARQ retransmission, which may indicate RLF. For another example, the UE may detect, based on physical layer synchronization status, that RLF has occurred in a path. The physical layer synchronization status may be, for example, the in-sync or out-of-sync indication from the physical layer. The UE may detect, for example, that a number of consecutive out-of-sync indications is received from the physical layer and the number exceeds a predefined threshold, which may indicate RLF.

RLF in indirect path may be due to RLF in connection between the remote UE 210 and the relay UE 230, e.g. in PC5 interface, or in connection between the relay UE 230 and network node 220, e.g. in Uu interface. If the RLF is in connection between the relay UE 230 and network node 220, e.g. in Uu interface, the remote UE may detect the RLF by receiving information on the RLF from the relay UE 230.

The remote UE may be configured to report the RLF detected in one path to the network node to enable fast path recovery with the network node.

However, it might not be always necessary to perform the fast path recovery. For example, if a remaining path, which is available after RLF of one path, has good radio conditions to fulfil the needs of the remote UE, it might not be necessary to recover the failed path (path with detected RLF) with the fast path recovery.

As another example, remote UE may move and be out of coverage of the network, and the failed path may be the direct path. Cell access of the remote UE using direct path might not be possible to any one of the cells. In this case, it is not possible to recover the direct path, because the remote UE might not be able to access to any cell of any network node, if the remote UE is out of coverage of the whole network. If there is the limitation that the direct path and indirect path need to be connected to the same network node, the possibility of recovering the direct path or indirect path is even lower. This is because the remote UE might not be able to discover a candidate relay UE served by or camping on a cell of the same network node the direct path was connected to, or the remote UE might not be in the coverage of the cells for establishing the direct path to the same network node that the indirect path was connected to. In this case, the network might not be able to recover the multipath connectivity for the remote UE even if the remote UE reported the RLF to the network.

As a further example, the failed path may be the indirect path. RLF of the indirect path may be due to SL problem, e.g. PC5 link problem, or due to air interface problem, e.g. Uu link problem at the relay UE. If the remote UE does not discover any other candidate relay UE, the indirect path cannot be recovered.

Thus, it might not always be useful to report a detected RLF of one path via another available path to the network node.

Therefore, a method is provided for enabling a user equipment, e.g. a remote UE, to determine whether or not to report a detected RLF to a network node.

Figure 3:
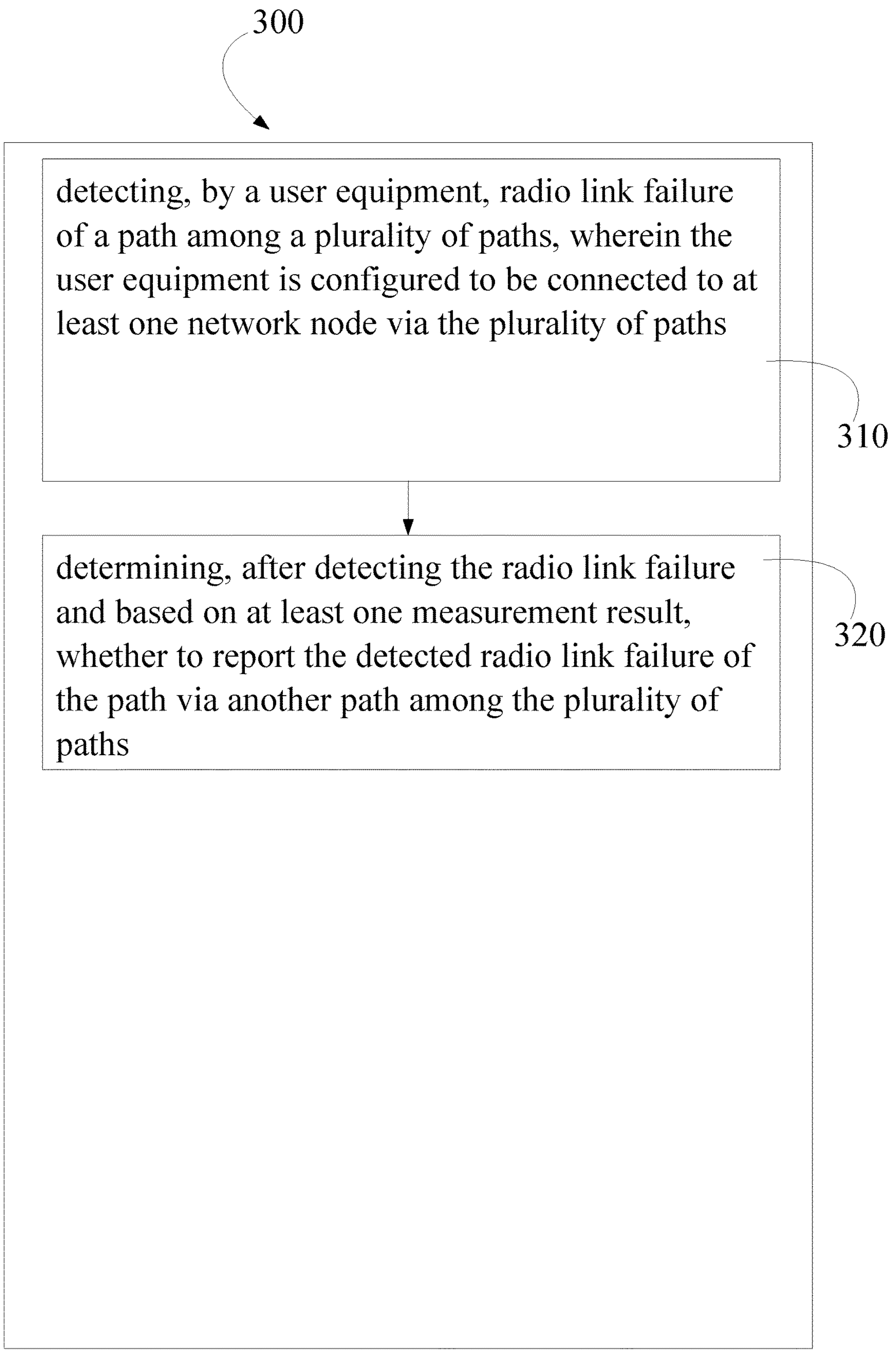
FIG. 3 shows, by way of example, a flowchart of a method.

FIG. 3 shows, by way of example, a flowchart of a method 300. The phases of the illustrated method may be performed by a UE, or by a control device configured to control the functioning thereof, when installed therein. The UE may be, for example, a remote UE, such as the device 210 of FIG. 2 or the device 410 of FIG. 4, which is configured to perform at least the method 300. The method 300 comprises detecting 310, by a user equipment, radio link failure of a path among a plurality of paths, wherein the user equipment is configured to be connected to at least one network node via the plurality of paths. The method 300 comprises determining 320, after detecting the radio link failure and based on at least one measurement result, whether to report the detected radio link failure of the path via another path among the plurality of paths.

The method as disclosed herein enables avoiding unnecessary signalling overhead, avoiding unnecessary processing overhead, reducing radio resource load and additional power consumption, and avoiding unnecessary path recovery procedures, since the RLF is not reported in vain, or at least the unnecessary RLF reports are reduced.

Figure 4:
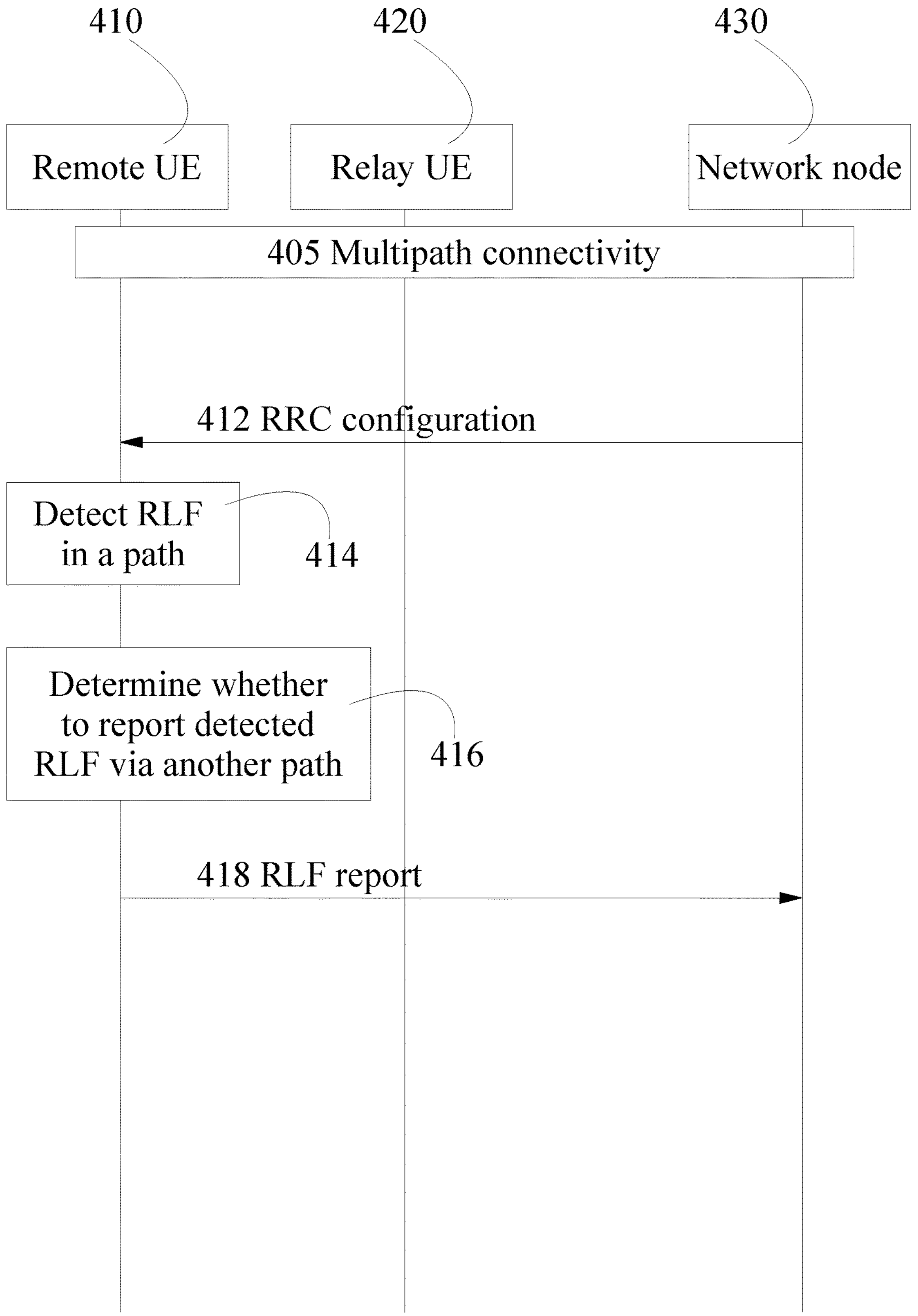
FIG. 4 shows, by way of example, signalling between entities.

FIG. 4 shows, by way of example, signalling between entities. A user equipment (UE) 210 may be a remote UE configured with multipath (MP) connectivity 405. The remote UE may be connected to a network node 430, e.g. gNB, via a plurality of paths. The path may be a direct path or an indirect path. When the remote UE 410 is connected to the network node 430 at least via an indirect path, the connection is via a relay UE 420, as in the example of FIG. 4.

The remote UE 410 may be connected to the network node 430 via direct path(s) and indirect path(s), or the remote UE may be connected to the network node such that all the paths are indirect paths.

Alternatively, the UE 210 may be configured with multi-connectivity (MC) and be connected to at least two different network nodes via direct paths. The remote UE may be connected to a cell in a master cell group (MCG) and a cell in a secondary cell group (SCG), for example.

The remote UE 410 may receive, from the network node 430, a configuration 412 for the at least one measurement, e.g. radio measurement. The configuration may be received via radio resource control (RRC) configuration, for example. The configuration may be indicative of at least one threshold related to the at least one measurement, wherein the at least one threshold sets a condition for reporting a detected radio link failure in one of the paths via another path.

Alternatively, the remote UE 410 may be preconfigured or configured by implementation with the at least one measurement and at least one threshold related to the at least one measurement, wherein the at least one threshold sets a condition for reporting a detected radio link failure in one of the paths. For example, the network node may configure the UE with configuration determining whether reporting detected radio link failure of one path via another path is allowed or not.

The remote UE 410 may detect 414 a radio link failure (RLF) of a path among the plurality of paths. Exemplary ways to detect the RLF have been described above.

At least one path, which is still available for the remote UE 410 after the detected RLF, may be referred to as another path or the another path. The another path is an available path after one of the paths has failed due to RLF.

The remote UE 410 may be configured to perform at least one measurement, e.g. radio measurement, according to configuration or preconfiguration. The remote UE obtains at least one measurement result from the at least one measurement.

The at least one measurement or measurement result is at least one of: data rate of the another path; average delay of the another path; amount of data in a buffer of the remote UE; constant bit rate of the another path; average bit rate of the another path; measurement of at least one other cell than a serving cell of the apparatus; or measurement of at least one candidate relay UE. Measurement of at least one other cell may be, for example, RSRP, RSRQ, signal interference and noise ratio (SINR), or some other Uu measurement. Measurement of at least one candidate relay UE may be related to sidelink radio link measurements and may comprise, for example, SL RSRP or sidelink discovery (SD) RSRP.

For example, configuration of the measurements and/or corresponding thresholds may be path specific or resource bearer (RB) specific. For example, the configuration of the measurement on data rate, the average delay, the amount of data in the buffer may be configured per end-to-end RB specific, and the channel busy ratio (CBR) measurements and thresholds may be path specific. The configuration may further indicate that the at least one measurement may be performed in packet data convergence protocol (PDCP) layer or above.

For example, the remote UE may be configured to reuse measurement(s) or even-triggered measurement reports, which have already been configured for other purposes, to the purpose of determining whether to send the RLF report of one path via another path. Thresholds for the measurements may be modified to better suit for the purpose of determining whether to send the RLF report of one path via another path. For example, a reference offset to the thresholds of state-of-the-art measurements may be provided by configuration.

The remote UE may determine 416, after detecting the RLF and based on at least one measurement result, whether to report the detected RLF of the path via another path among the plurality of paths.

There may be more than one available paths after detected RLF of one path. The UE may select an available path for reporting the RLF. For example, if the primary path is one of the available paths, the UE may select the primary path as the another path. As another example, the UE may select the path, via which a signalling radio bearer is configured to be transmitted, as the another path. As another example, the UE may select the path with best link condition as the another path. As another example, the UE may select the path with the lowest delay or latency as the another path.

The remote UE may compare the at least one measurement result to at least one threshold. The at least one threshold sets a condition for reporting the detected RLF. If the remote UE determines, based on the comparison, that the at least one measurement result meets the condition set by the at least one threshold, the remote UE reports 418 the detected RLF of the path via another path. The report of the detected RLF may be indicative of the failed path.

If the remote UE determines, based on the comparison, that the at least one measurement result does not meet the condition set by the at least one threshold, the remote UE refrains from reporting the detect RLF. In other words, the remote UE does not report the detect RLF in this case.

Based on the measurement(s), the remote UE determines, whether it is useful to report the RLF to the network node or not. For example, reporting may be useful if it is probable that a fast path recovery may be configured by the network. As another example, reporting may be useful if the network node may determine, based on the received report, to stop sending data via the failed path.

For example, the detected RLF is detected on a direct path. The UE has obtained a measurement result from a measurement of at least one other cell than a serving cell of the remote UE. The other cell may be a neighbouring cell. The measurement of at least one other cell may comprise, for example, RSRP, RSRQ or signal interference and noise ratio (SINR). If the measurement results meet a threshold setting a condition for reporting the detect RLF, the remote UE reports the detected RLF of the direct path via the another path. The threshold may be such that when met, the measurement result indicates that the cell is suitable for providing a direct path for the remote UE 410 to connect to the network. The another path may be an indirect path to the network node. Alternatively, the another path may be a path to another network node. The another network node may, after receiving the report, contact the network node which the failed path was connected to, to recover the direct path. Or the another network node may contact the neighbouring cell indicated in the report, for example.

The network node 430 receives the report and may perform fast recovery of the direct path by reconfiguring the remote UE 410 to connect to the at least one other cell directly. The remote UE 410 may have provided indication of the other cell, or measurement data of the other cell to the network node 430, for example, along with the RLF report 418. Reporting of the measurement data is described below.

There may be a plurality of neighbouring cells. A common threshold may be configured for the neighbouring cells, or a different threshold may be configured for different neighbouring cells or different types of neighbouring cells. Different types of neighbouring cells may comprise, for example, neighbouring macro or micro cells. The different neighbouring cells may comprise, for example, cells controlled by the same or different network node that the available path is connected to.

Additional reporting condition for the case of RLF in direct path may be that the remote UE 410 should have discovered a candidate relay UE from the same neighbouring cell for which the remote UE has direct Uu link measurements above a threshold.

As another example, the detected RLF is detected on an indirect path. The remote UE 410 has obtained a measurement result indicating that at least one candidate relay UE has been found in discovery. In this case, the measurement is a measurement of at least one candidate relay UE or a measurement relating to discovery of at least one candidate relay UE. A condition for reporting the detected RLF on the indirect path is met if at least one candidate relay UE is found. A condition for reporting the detected RLF on the indirect path is not met if at least one candidate relay UE is not found. Discovery of the relay UE may be based on measurements such as quality of service (QOS) requirements, SL-RSRP or sidelink discovery RSRP (SD-RSRP). A threshold may be pre-defined for discovery measurements.

The remote UE may determine that at least one measurement result indicates that at least one candidate relay UE has been found in discovery. Then, the remote UE 410 reports 418 the detected RLF of the indirect path via the another path.

The network node 430 receives the report and may perform fast recovery of the indirect path by reconfiguring the remote UE 410 to switch the indirect path to the at least one candidate relay UE found in the discovery. The remote UE may have provided indication on the found candidate relay UE or measurement data related to the candidate relay UE to the network node.

For example, the remote UE 410 may have been configured to report the RLF of the indirect path only if the found candidate relay UE is connected to a certain cell, e.g. to a cell under the same network node as the path through which the remote UE reports the RLF.

The remote UE 410 may have been configured to report the RLF of the indirect path only if the found candidate relay UE is connected to a cell under the same network node as a neighbouring cell of which the remote UE has measurement higher than a threshold. In this case, the fast path recovery may be performed by configuring the remote UE to handover the direct path to the neighbouring cell and recover the indirect path via the found relay UE to the cell, which is controlled by the same network as the neighbouring cell.

As a further example, the detected RLF is detected on an indirect path due to the failure on the link between the remote UE and the relay UE. For example, the detected RLF is detected in the PC5 interface, not in the Uu interface. At least one measurement result indicates that the RLF has occurred in a radio link between the remote UE and the relay UE. Then, the remote UE 410 reports the detected RLF of the indirect path via the another path.

The network node 430 receives the report and stops sending downlink data in the indirect path via the relay UE. The reporting of the RLF in this case is useful, since it enables preventing the network node to send data via failed path.

As a further example, the detected RLF is detected in one path. The remote UE may determine, based on at least one measurement result obtained from a measurement of data transmission via the another path, that the another path meets traffic requirements of the remote UE. Then, the remote UE refrains from reporting the detected RLF. In this case, path recovery might not be needed as the another path is sufficient to serve the remote UE.

If the another path does not meet the traffic requirements of the remote UE, the remote UE reports the detected RLF.

A combination of the measurement results may be used in determining whether to report the RLF of one path via another path. For example, the remote UE may detect RLF in a radio link between the relay UE and the network node (Uu interface). This detection may be based on information received from the relay UE via PC5 interface. If the remote UE has found at least one candidate relay UE in discovery, the remote UE may report the RLF via direct path. Otherwise, it might not be useful to report the RLF in the Uu interface.

If the RLF is detected in the PC5 interface, the remote UE may be configured to report the RLF even if the measurements of data transmission via the another path meet the traffic requirements of the remote UE.

The remote UE may be configured to take into account the variation of the conditions of the another path (available path) to determine whether the RLF of one path should be reported via the another path or not. For example, the remote UE may identify a big change (e.g. larger than a configured threshold) in radio conditions of the another path based on a current measurement and a previous measurement. The big change may be due to high mobility of the remote UE, for example. In this case, the remote UE may determine to report the RLF of one path via the another path even if the measurements of data transmissions via the another path meet the traffic requirements of the remote UE.

The remote UE may have already been triggered to send measurement reports of the another path to the network node, which implies that handover or path switching may be prepared by the network node. In this case, the remote UE may determine to report the RLF of one path via the another path even if the measurements of data transmissions via the another path meet the traffic requirements of the remote UE.

Figure 5:
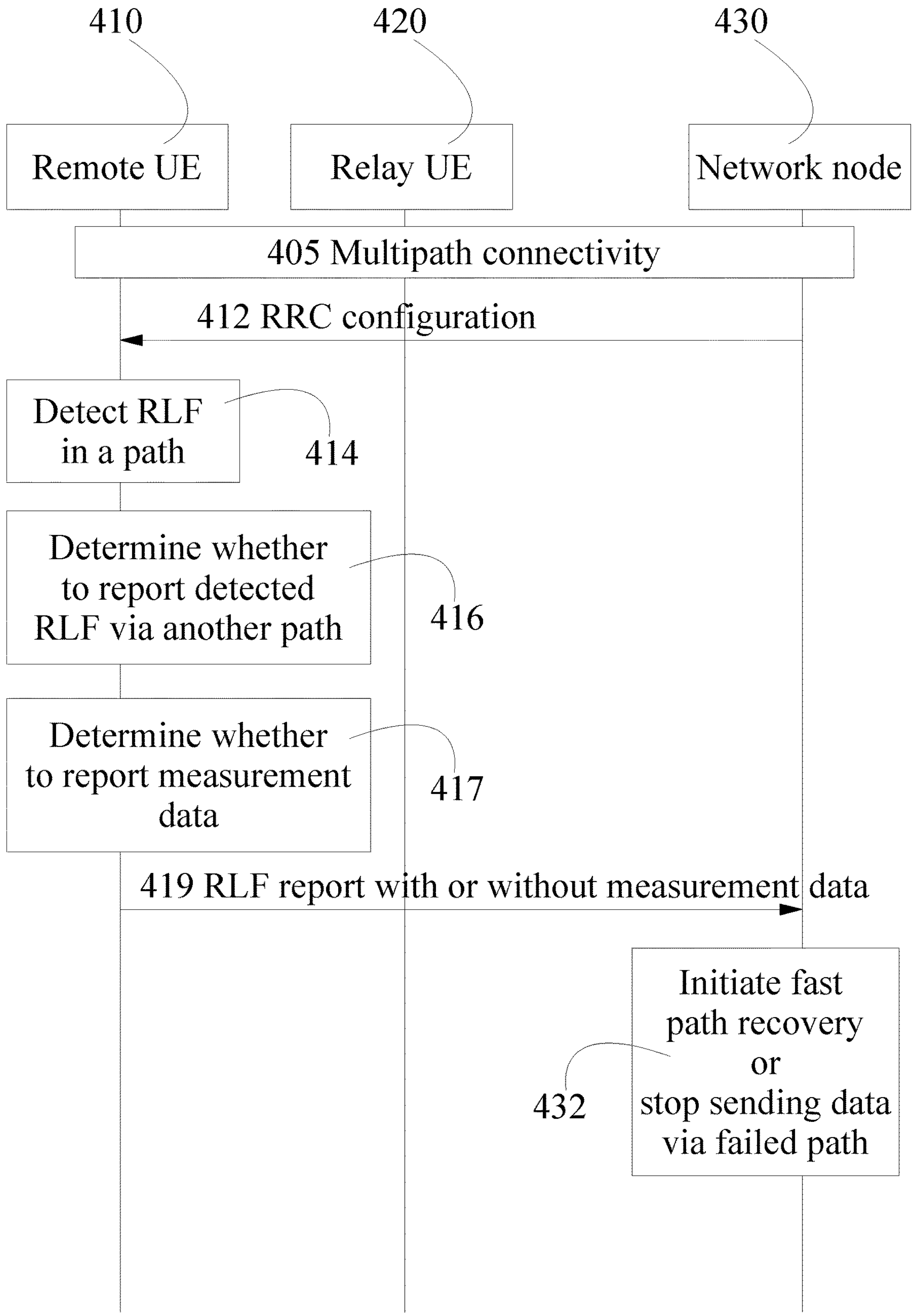
FIG. 5 shows, by way of example, signalling between entities.

FIG. 5 shows, by way of example, signalling between entities. The reference numbers 405, 412, 414, 416 correspond to the same reference numbers of FIG. 4. In the example of FIG. 5, the RRC configuration 412 may comprise configuration for reporting measurement data via the another path after detecting RLF in one path.

The remote UE 410 may receive, from the network node 430, a configuration for reporting measurement data via the another path. The configuration is indicative of at least one condition for reporting the measurement data. The measurement data comprises at least one of: measurement data related to the another path; measurement data related to at least one other cell than a serving cell of the remote UE; or measurement data related to at least one candidate relay UE. Measurement data related to the another path may comprise measurements of direct path(s) and/or indirect path(s). For example, the measurement data may comprise Uu and/or SL measurements and/or SD measurements.

The configuration for reporting measurement data may comprise an instruction for the remote UE to report, after detecting the RLF of the path, the configured measurement data.

The remote UE 410 may determine 417 whether to report the measurement data, e.g. by including the measurement data into the report of detected RLF of one path. The determination of whether to report the measurement data to the network node 430 may be based on need or no need of the fast path recovery, or possibility of the fast path recovery, or timing or offset of the current measurement and previously transmitted measurement report.

For example, the remote UE 410 may need fast path recovery and determines to report measurement data such as amount of data in the buffer of the remote UE. The remote UE 410 may report 419 the measurement data along with the RLF report, for example. After receiving the report, the network node 430 may initiate 432 fast path recovery so that the remote UE will be able to transmit the data in the buffer.

As another example, the remote UE 410 may report RLF of one path, but determines not to report measurement data such as measurement data related to at least one other cell or at least one candidate relay UE. After receiving the RLF report 419 without measurement data, the network node 430 may determine that the another path, or some other available path, is sufficient to fulfil the traffic requirements of the remote UE. Then, the network node may decide not to initiate fast path recovery or handover or path switching.

After receiving the RLF report indicating RLF in one path, with or without measurement data, the network node may determine to stop 432 sending data to the remote UE via the failed path.

The remote UE may determine not to report measurement data of serving cell and/or serving relay UE and candidate relay UEs and/or neighbouring cells if the previous measurement report was sent within a configured time period or a difference of the current and previous measurement results are within a configured offset value.

The remote UE 410 may determine 417, based on at least one measurement result obtained from a measurement of data transmission via the another path, whether to report measurement data related to at least one other cell than a serving cell of the apparatus and/or measurement data related to at least one candidate relay user equipment and/or measurement data related to the another path. If the another path fulfils the traffic requirements of the remote UE, the remote UE might not need to report the measurement data. If the another path does not fulfil the traffic requirements of the remote UE, the remote UE may report the measurement data to enable the network node to act accordingly. The network node may perform or initiate the fast path recovery, handover or path switch.

For example, if the remote UE needs fast path recovery, the remote UE may be configured to report measurement data related to at least one other cell than a serving cell of the apparatus (Uu measurements) or an indication of the prioritized cell. If the remote UE needs path switch to another UE relay, the remote UE may be configured to report measurement data related to at least one candidate relay user equipment, which may include SL or SD measurements, or an indication of the prioritized relay UE. Sending measurement data may enable the network node to perform fast path recovery as soon as possible.

If the aim is to prevent the network node to send downlink data via failed path, and fast path recovery is not expected, the remote UE might not need to send the measurement data to the network node.

Figure 6:
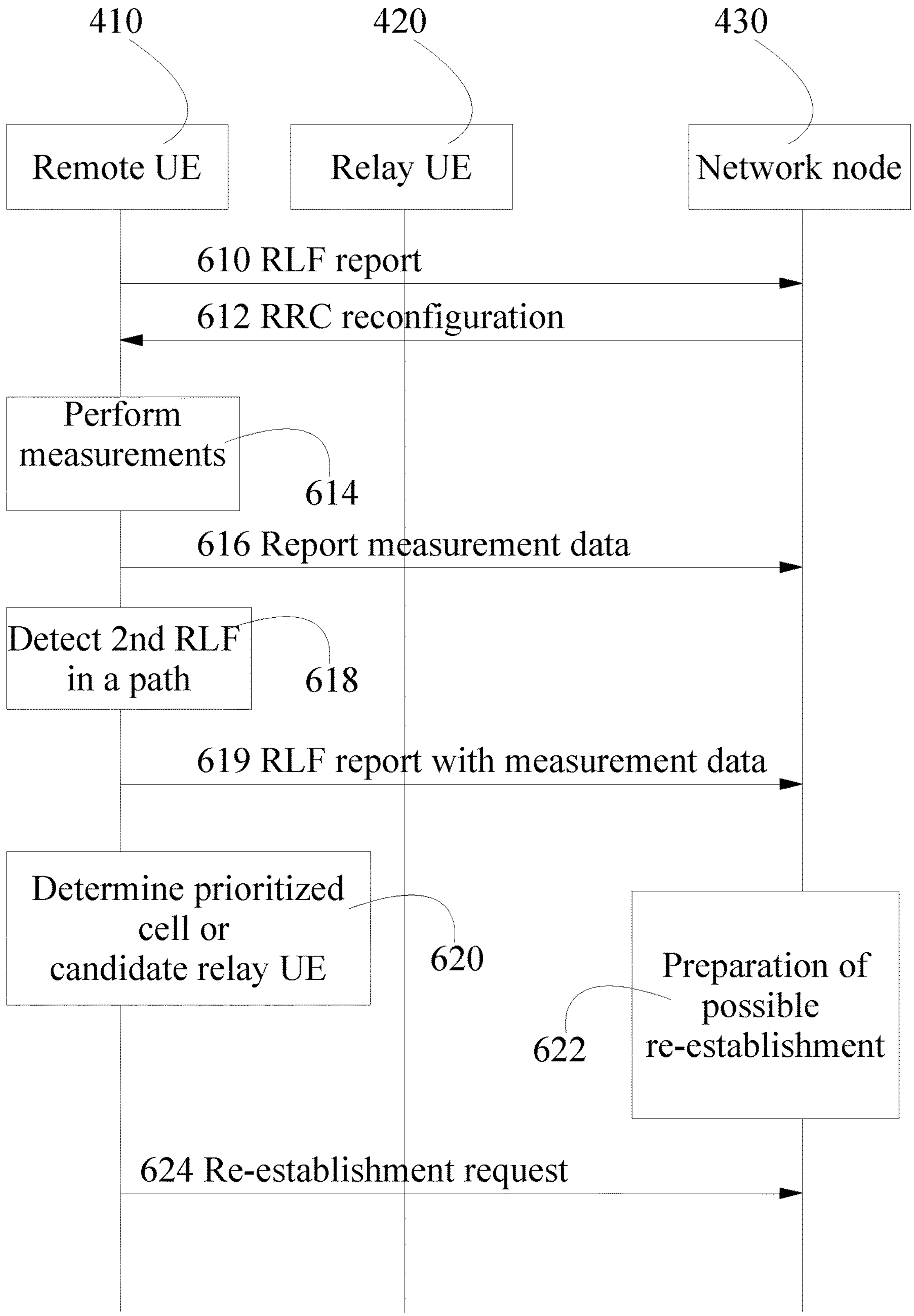
FIG. 6 shows, by way of example, signalling between entities.

FIG. 6 shows, by way of example, signalling between entities. The remote UE 410 has transmitted RLF report of one path via the another path to the network node 430. The network node 430 may configure measurements for the remote UE 410 via reconfiguration.

For example, the configuration for reporting measurement data may be received via RRC reconfiguration 612 procedure after the network node 430 has received a report 610 of RLF of one path via the another path. The reconfigured measurements may relate to the another path, and enable more aggressive measurements on the another path to prevent RLF of the another path, or at least reduce the possibility of the RLF of the another path. Reconfigured measurements may relate to direct path(s) or indirect path(s).

For example, the at least one condition for reporting may be different thresholds than those triggering legacy measurement reports. By triggering more aggressive measurement reports relating to the another path, the network node may take actions to prevent RLF on the another path.

For example, the network node 430 may configure the remote UE 410 to transmit a fresh measurement report relating to the another path anytime when RLF is detected in the another path. For example, the remote UE may be configured to neglect the configured event-triggered reporting (legacy reporting).

The remote UE may perform 614 and report 616 the configured measurement data via the another path.

Despite of the more aggressive measurements on the another path, RLF may occur on the another path. The remote UE 410 detects 618 a second RLF in a path, e.g. in the another path. The remote UE 410 transmits 619 RLF report of the path via some other path to the network node 430, if there is still available path. The determination on whether to transmit the second RLF report to the network node 430 or not can be the same as described above for the first RLF of a path.

If there is no available path to report the second RLF, the remote UE 410 may determine 620 a prioritized cell or a prioritized candidate relay UE based on the reported measurement data to initiate the re-establishment of the connection with the network node 430. The remote UE 410 may transmit 624, to the network node 430, a re-establishment request via the prioritized cell or the prioritized candidate relay UE to initiate RRC re-establishment. The prioritized cell may be selected based on radio measurements of the cell, e.g. based on highest Uu measurement among the reported Uu measurements, such as RSRP, RSRQ or SINR. The prioritized candidate relay UE may be selected based on radio measurements related to the candidate relay UEs, e.g. based on highest SL measurement among the reported SL measurements, such as SL-RSRP and/or SD-RSRP.

As the remote UE 410 has already reported the measurements, e.g. the Uu and/or SL measurements, to the network node 430, the network node may prepare 622 a target cell for recovering the failed path or for handover; or prepare a target relay UE for path switching. As the remote UE 410 initiates the re-establishment of RRC connection 624 via the prioritized cell or candidate relay UE, there is higher probability that the prioritized cell or the relay UE has been prepared in the network side for the fast path recovery or handover or path switching. This way, the re-establishment of RRC connection is initiated to the prepared cell or to the prepared relay UE to have a faster procedure.

Figure 7:
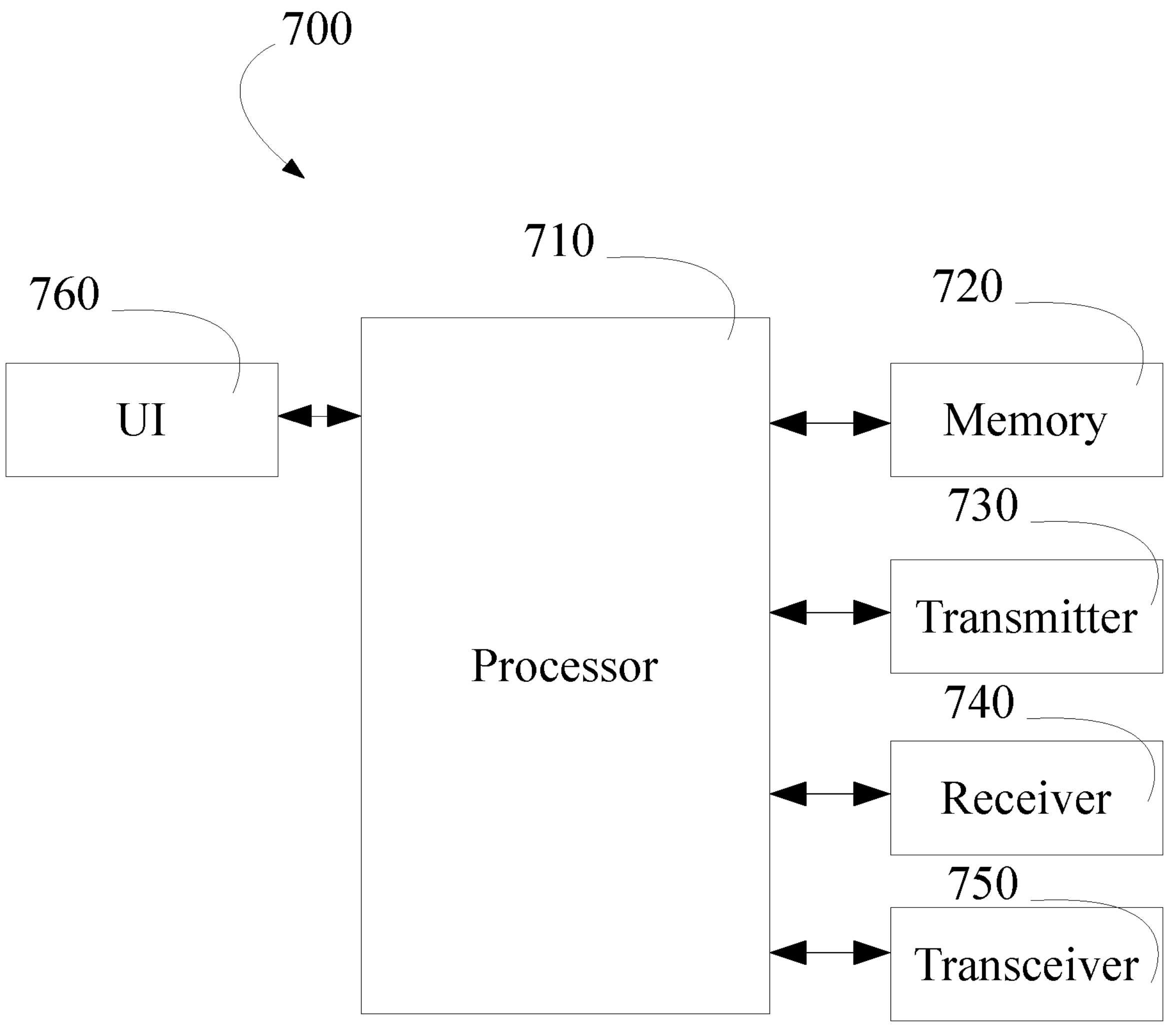
FIG. 7 shows, by way of example, a block diagram of an apparatus.

FIG. 7 shows, by way of example, an apparatus capable of performing at least the method(s) as disclosed herein. Illustrated is device 700, which may comprise, for example, a mobile communication device such as UE 210 of FIG. 2 or UE 410 of FIG. 4, FIG. 5 or FIG. 6; or a network node 430 of FIG. 4, FIG. 5 or FIG. 6. Comprised in device 700 is processor 710, which may comprise, for example, a single- or multi-core processor wherein a single-core processor comprises one processing core and a multi-core processor comprises more than one processing core. Processor 710 may comprise, in general, a control device. Processor 710 may comprise more than one processor. Processor 710 may be a control device. Processor 710 may comprise at least one application-specific integrated circuit, ASIC. Processor 710 may comprise at least one field-programmable gate array, FPGA. Processor 710 may be means for performing method steps in device 700. Processor 710 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a user equipment or a network node, to perform various functions) and (c) hardware circuit(s) and or processor(s), such as a microprocessor(s) or a portion of a microprocessor (s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 700 may comprise memory 720. Memory 720 may comprise random-access memory and/or permanent memory. Memory 720 may comprise at least one RAM chip. Memory 720 may comprise solid-state, magnetic, optical and/or holographic memory, for example. Memory 720 may be at least in part accessible to processor 710. Memory 720 may be at least in part comprised in processor 710. Memory 720 may be means for storing information. Memory 720 may comprise instructions, such as computer instructions or computer program code, that processor 710 is configured to execute. When instructions configured to cause processor 710 to perform certain actions are stored in memory 720, and device 700 overall is configured to run under the direction of processor 710 using instructions from memory 720, processor 710 and/or its at least one processing core may be considered to be configured to perform said certain actions. Memory 720 may be at least in part external to device 700 but accessible to device 700.

Device 700 may comprise a transmitter 730. Device 700 may comprise a receiver 740. Transmitter 730 and receiver 740 may be configured to transmit and receive, respectively, information in accordance with at least one cellular or non-cellular standard. Transmitter 730 may comprise more than one transmitter. Receiver 740 may comprise more than one receiver. Transmitter 730 and/or receiver 740 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 700 may comprise a near-field communication, NFC, transceiver 750. NFC transceiver 750 may support at least one NFC technology, such as NFC, Bluetooth, Wibree or similar technologies.

Device 700 may comprise user interface, UI, 760. UI 760 may comprise at least one of a display, a keyboard, a touchscreen, a vibrator arranged to signal to a user by causing device 700 to vibrate, a speaker and a microphone. A user may be able to operate device 700 via UI 760, for example to accept incoming telephone calls, to originate telephone calls or video calls, to browse the Internet, to manage digital files stored in memory 720 or on a cloud accessible via transmitter 730 and receiver 740, or via NFC transceiver 750, and/or to play games.

Processor 710 may be furnished with a transmitter arranged to output information from processor 710, via electrical leads internal to device 700, to other devices comprised in device 700. Such a transmitter may comprise a serial bus transmitter arranged to, for example, output information via at least one electrical lead to memory 720 for storage therein. Alternatively to a serial bus, the transmitter may comprise a parallel bus transmitter. Likewise processor 710 may comprise a receiver arranged to receive information in processor 710, via electrical leads internal to device 700, from other devices comprised in device 700. Such a receiver may comprise a serial bus receiver arranged to, for example, receive information via at least one electrical lead from receiver 740 for processing in processor 710. Alternatively to a serial bus, the receiver may comprise a parallel bus receiver.

Processor 710, memory 720, transmitter 730, receiver 740, NFC transceiver 750, and/or UI 760 may be interconnected by electrical leads internal to device 700 in a multitude of different ways. For example, each of the aforementioned devices may be separately connected to a master bus internal to device 700, to allow for the devices to exchange information. However, as the skilled person will appreciate, this is only one example and depending on the embodiment various ways of interconnecting at least two of the aforementioned devices may be selected.

The term "non-transitory" as used herein, is a limitation of the medium itself (i.e., tangible, not a signal) as opposed to a limitation on data storage persistency (e.g., RAM vs. ROM).

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

Figure 8:
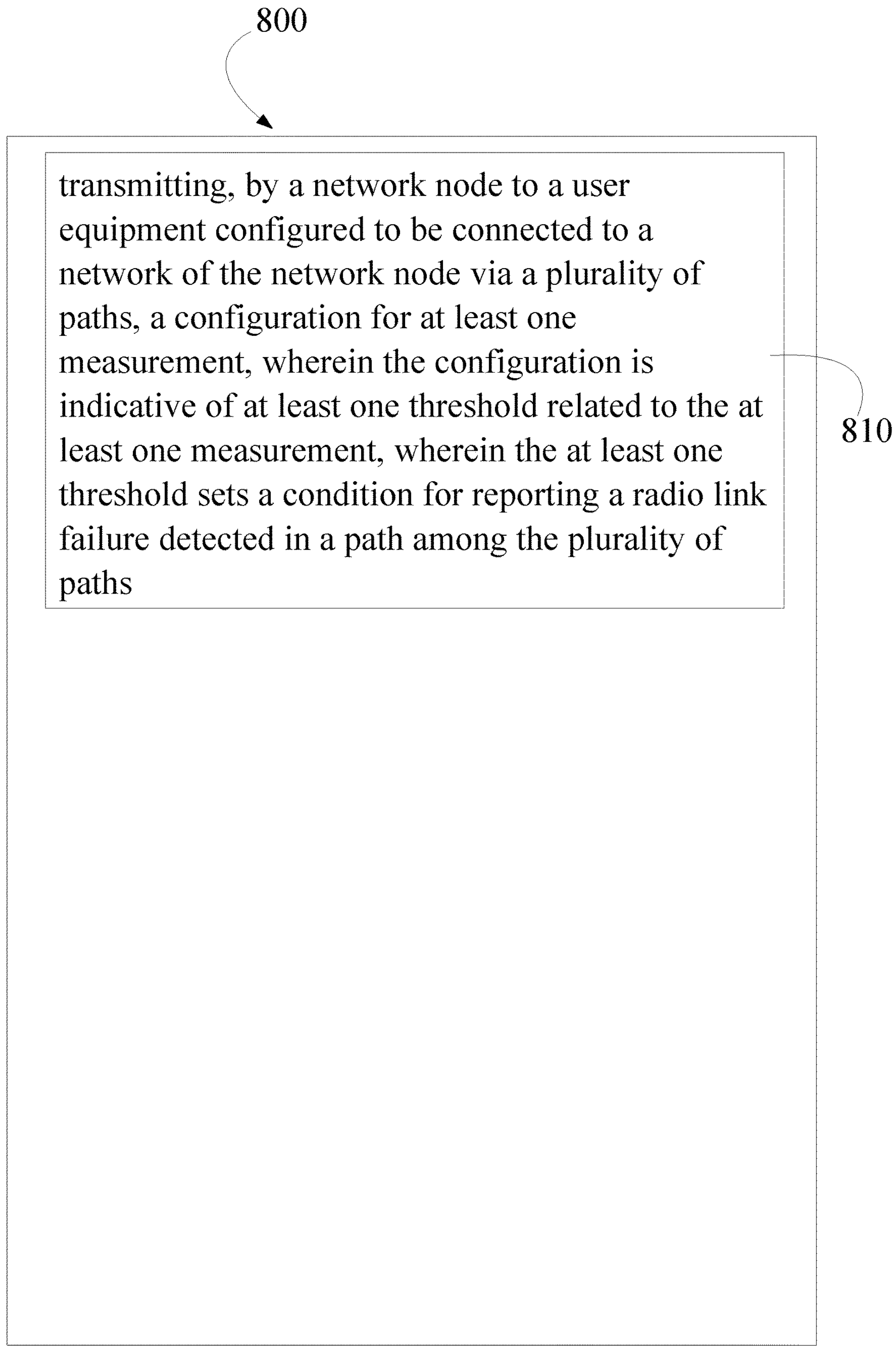
FIG. 8 shows, by way of example, a flowchart of a method.

FIG. 8 shows, by way of example, a flowchart of a method 800. The phases of the illustrated method may be performed by a network node, or by a control device configured to control the functioning thereof, when installed therein. The network node may be, for example, the network node, e.g. gNB, 220 of FIG. 2 or the device 430 of FIG. 4, which is configured to perform at least the method 800. The method 800 comprises transmitting 810, by a network node to a user equipment configured to be connected to a network of the network node via a plurality of paths, a configuration for at least one measurement, wherein the configuration is indicative of at least one threshold related to the at least one measurement, wherein the at least one threshold sets a condition for reporting a radio link failure detected in a path among the plurality of paths.

According to an embodiment, the method comprises: receiving a report of the radio link failure without measurement data, wherein the report is indicative of a failed path; determining, based on the report without measurement data, that the user equipment does not need path recovery procedures; and/or stopping transmissions via the failed path.

According to an embodiment, the method comprises: transmitting, to the user equipment, a configuration for reporting measurement data via the another path, wherein the configuration is indicative of at least one condition for reporting, and wherein the measurement data comprises at least one of: measurement data related to the another path; measurement data related to at least one other cell; or measurement data related to at least one candidate relay user equipment.

According to an embodiment, the configuration comprises an instruction for the user equipment to report, after detecting the radio link failure of the path, the measurement data according to the configuration.

According to an embodiment, the method comprises receiving, via the another path, the measurement data according to the configuration.

According to an embodiment, the method comprises determining, based on the received measurement data, a prioritized cell or a prioritized candidate relay UE for the user equipment; and preparing the prioritized cell to recover the failed path or for handover; or preparing the prioritized candidate relay UE for path switching.

According to an embodiment, the method comprises receiving a re-establishment request via the prioritized cell or the prioritized candidate relay UE.

The invention claimed is:

1. An apparatus, comprising:

at least one processor; and at least one memory storing computer-executable instructions that, when executed by the at least one processor, cause the at least one processor to perform the following operations:

detecting radio link failure of a path among a plurality of paths, wherein the apparatus is configured to be connected to at least one network node via the plurality of paths;

determining, after detecting the radio link failure and based on results of a plurality of measurements, whether to report the detected radio link failure of the path via another path among the plurality of paths, the plurality of measurements comprising: a data rate of the another path, an average delay of the another path, an amount of data in a buffer of the apparatus, a channel busy ratio of the another path, an average bit rate of the another path, a measurement of at least one other cell than a serving cell of the apparatus, and a measurement relating to discovery of at least one candidate relay user equipment;

determining that the results of the plurality of measurements indicate that the at least one candidate relay user equipment has been found in discovery;

comparing the results of the plurality of measurements to at least one threshold, wherein the at least one threshold sets a condition for reporting the detected radio link failure;

determining, based on the comparing, that the results of the plurality of measurements meet the condition set by the at least one threshold;

based on determining that the results of the plurality of measurements indicate that the at least one candidate relay user equipment has been found in discovery and based on determining that the results of the plurality of measurements meet the condition set by the at least one threshold, reporting the detected radio link failure of the path via another path among the plurality of paths;

receiving a reconfiguration to switch the path to the at least one candidate relay user equipment found in discovery; and switching the path to the at least one candidate relay user equipment found in discovery.

2. The apparatus of claim 1, wherein at least one path of the plurality of paths is an indirect path via the at least one candidate user equipment.

3. The apparatus of claim 2, wherein the computer-executable instructions further cause the processor to perform at least one radio measurement to obtain the results of the plurality of measurements.

4. The apparatus of claim 3, wherein the computer-executable instructions further cause the processor to receive a configuration for the plurality of measurements.

5. The apparatus of claim 4, wherein the configuration is indicative of the at least one threshold.

6. The apparatus of claim 1, wherein the computer-executable instructions further cause the processor to receive a configuration for reporting measurement data via the another path, wherein the configuration is indicative of at least one condition for reporting, and wherein the measurement data comprises: measurement data related to the another path; measurement data related to at least one other cell; and measurement data related to the at least one candidate relay user equipment.

7. The apparatus of claim 6, wherein the configuration comprises an instruction for the apparatus to report, after detecting the radio link failure of the path, the measurement data according to the configuration.

8. The apparatus of claim 7, wherein the computer-executable instructions further cause the processor to perform the following operations:

reporting, via the another path, the measurement data according to the configuration;

detecting a radio link failure on the another path;

determining a prioritized cell or a prioritized candidate relay user equipment based on the reported measurement data; and transmitting a re-establishment request via the prioritized cell or the prioritized candidate relay user equipment.

9. A system, comprising:

an apparatus;

at least one processor; and at least one memory storing computer-executable instructions that, when executed by the at least one processor, cause the at least one processor to perform the following operations:

detecting radio link failure of a path among a plurality of paths, wherein the apparatus is configured to be connected to at least one network node via the plurality of paths;

determining, after detecting the radio link failure and based on results of a plurality of measurements, whether to report the detected radio link failure of the path via another path among the plurality of paths, the plurality of measurements comprising: a data rate of the another path, an average delay of the another path, an amount of data in a buffer of the apparatus, a channel busy ratio of the another path, an average bit rate of the another path, a measurement of at least one other cell than a serving cell of the apparatus, and a measurement relating to discovery of at least one candidate relay user equipment;

determining that the results of the plurality of measurements indicate that the at least one candidate relay user equipment has been found in discovery;

comparing the results of the plurality of measurements to at least one threshold, wherein the at least one threshold sets a condition for reporting the detected radio link failure;

determining, based on the comparing, that the results of the plurality of measurements meet the condition set by the at least one threshold;

based on determining that the results of the plurality of measurements indicate that the at least one candidate relay user equipment has been found in discovery and based on determining that the results of the plurality of measurements meet the condition set by the at least one threshold, reporting the detected radio link failure of the path via another path among the plurality of paths;

receiving a reconfiguration to switch the path to the at least one candidate relay user equipment found in discovery; and switching the path to the at least one candidate relay user equipment found in discovery.

10. The system of claim 9, wherein at least one path of the plurality of paths is an indirect path via the at least one candidate user equipment.

11. The system of claim 10, wherein the computer-executable instructions further cause the processor to perform at least one radio measurement to obtain the results of the plurality of measurements.

12. The system of claim 11, wherein the computer-executable instructions further cause the processor to receive a configuration for the plurality of measurements.

13. The system of claim 12, wherein the configuration is indicative of the at least one threshold.

14. The system of claim 9, wherein the computer-executable instructions further cause the processor to receive a configuration for reporting measurement data via the another path, wherein the configuration is indicative of at least one condition for reporting, and wherein the measurement data comprises: measurement data related to the another path; measurement data related to at least one other cell; and measurement data related to the at least one candidate relay user equipment.

15. The system of claim 14, wherein the configuration comprises an instruction for the apparatus to report, after detecting the radio link failure of the path, the measurement data according to the configuration.

16. The system of claim 15, wherein the computer-executable instructions further cause the processor to perform the following operations:

reporting, via the another path, the measurement data according to the configuration;

detecting a radio link failure on the another path;

determining a prioritized cell or a prioritized candidate relay user equipment based on the reported measurement data; and transmitting a re-establishment request via the prioritized cell or the prioritized candidate relay user equipment.

17. A method comprising:

detecting, by an apparatus, radio link failure of a path among a plurality of paths, wherein the apparatus is configured to be connected to at least one network node via the plurality of paths;

determining, by the apparatus after detecting the radio link failure and based on results of a plurality of measurements, whether to report the detected radio link failure of the path via another path among the plurality of paths, the plurality of measurements comprising: a data rate of the another path, an average delay of the another path, an amount of data in a buffer of the apparatus, a channel busy ratio of the another path, an average bit rate of the another path, a measurement of at least one other cell than a serving cell of the apparatus, and a measurement relating to discovery of at least one candidate relay user equipment;

determining, by the apparatus, that the results of the plurality of measurements indicate that the at least one candidate relay user equipment has been found in discovery;

comparing, by the apparatus, the results of the plurality of measurements to at least one threshold, wherein the at least one threshold sets a condition for reporting the detected radio link failure;

determining, by the apparatus based on the comparing, that the results of the plurality of measurements meet the condition set by the at least one threshold;

based on determining that the results of the plurality of measurements indicate that the at least one candidate relay user equipment has been found in discovery and based on determining that the results of the plurality of measurements meet the condition set by the at least one threshold, reporting, by the apparatus, the detected radio link failure of the path via another path among the plurality of paths;

receiving, by the apparatus, a reconfiguration to switch the path to the at least one candidate relay user equipment found in discovery; and switching, by the apparatus, the path to the at least one candidate relay user equipment found in discovery.

18. The method of claim 17, wherein at least one path of the plurality of paths is an indirect path via the at least one candidate user equipment; and wherein the method further comprises:

performing at least one radio measurement to obtain the results of the plurality of measurements; and receiving a configuration for the plurality of measurements, wherein the configuration is indicative of the at least one threshold.

19. The method of claim 17, further comprising receiving a configuration for reporting measurement data via the another path, wherein the configuration is indicative of at least one condition for reporting, and wherein the measurement data comprises: measurement data related to the another path; measurement data related to at least one other cell; and measurement data related to the at least one candidate relay user equipment.

20. The method of claim 19, wherein the configuration comprises an instruction for the apparatus to report, after detecting the radio link failure of the path, the measurement data according to the configuration.

* * * * *